United States Patent [19]

Suzuka

[11] Patent Number: 5,541,703
[45] Date of Patent: Jul. 30, 1996

[54] CAMERA HAVING A WIRELESS REMOTE CONTROLLER

[75] Inventor: Shinya Suzuka, Tokyo, Japan

[73] Assignee: Asahi Kogaku Kogyo Kabushiki Kaisha, Tokyo, Japan

[21] Appl. No.: 222,905

[22] Filed: Apr. 5, 1994

[30] Foreign Application Priority Data

Apr. 6, 1993 [JP] Japan .................... 5-022819 U

[51] Int. Cl.⁶ .................... G03B 13/36; G03B 17/38
[52] U.S. Cl. .................... 354/403; 354/268
[58] Field of Search .................... 354/400, 402, 354/266, 268, 293, 403

[56] References Cited

U.S. PATENT DOCUMENTS

| | | | |
|---|---|---|---|
| 4,942,417 | 7/1990 | Miyazawa et al. | 354/400 |
| 5,159,375 | 10/1992 | Taniguchi | 354/400 |
| 5,223,878 | 6/1993 | Shintani et al. | 354/293 X |
| 5,247,327 | 9/1993 | Suzuka et al. | 354/266 X |
| 5,323,203 | 6/1994 | Maruyama et al. | 354/266 X |
| 5,355,189 | 10/1994 | Kobayashi et al. | 354/268 x |

*Primary Examiner*—W. B. Perkey
*Attorney, Agent, or Firm*—Kane, Dalsimer, Sullivan, Kurucz, Levy, Eisele and Richard, LLP

[57] ABSTRACT

A camera having a remote controller provided separate from a body of the camera, wherein, based upon a signal outputted from the remote controller, a zoom lens of the camera is driven in accordance with calculated distance measuring data and a shutter of the camera is released. The camera includes a focal length detecting mechanism for detecting all existing focal length of the zoom lens, a mechanism for setting a framing mode in which a photographer carrying a remote controller is framed in a predetermined manner when the signal is output from the remote controller, a control mechanism for comparing a first focal length detected by the focal length detecting mechanism with a second focal length determined in the framing mode set by the setting mechanism, and for releasing the shutter under the condition that the first focal length is equal to or shorter than the second focal length.

8 Claims, 7 Drawing Sheets

CAMERA HAVING A WIRELESS REMOTE CONTROLLER

BACKGROUND OF THE INVENTION

1. Field of the Invention

This invention is directed to a camera which is equipped with a wireless remote controller.

2. Description of Related Art

Cameras which are equipped with a wireless remote controller (hereinafter referred to as remote controller) provided separate from the camera body are widely known. This type of camera enables a photographer to photograph himself by operating the remote controller on the object side of the camera.

When a photographer photographs himself by using a camera of this type, the following operations are necessary. First, the photographer frames the background of the picture in which he will be photographed. He adjusts the posture of the camera on a tripod and also operates the zoom lens to adjust the focal length thereof so as to frame the desired picture. The photographer then situates himself in the desired position and operates the remote controller. A releasing signal is transmitted toward the camera so as to release the camera shutter. Upon reception of the releasing signal, the camera shutter is released, and a picture is taken in which the photographer is framed. In this former type of camera having the remote controller, the photographer must frame himself before the picture can be taken. However, the framing operation is obviously quite troublesome.

Considering this fact, in the U.S. Pat. No. 5,247,327, a camera equipped with a remote controller has been proposed which is provided with a framing mode in which distance data between the camera and the photographer is calculated in accordance with the signal outputted from the remote controller and received by the camera. The framing operation with respect to the photographing object (i.e., the photographer) is automatically carried out in accordance with the calculated distance data.

However, in this type of camera, the focal length of the zoom lens is continuously varied until the focal length is coincident with the focal length calculated in accordance with the distance data determined in the framing mode. In other words, the zoom lens in this type of camera is not likely to be driven directly to the desired focal length value, but rather surpass the desired value and oscillate about the desired value until the focal length is within an acceptably accurate range. The driving of the zoom lens and subsequent oscillation occurs even when the existing focal length is shorter than the focal length calculated in the framing mode. In this type of camera, even when the photographer is within the frame of the picture, the zoom lens is driven so as to adjust an existing focal length to the calculated focal length. This driving operation of the zoom lens results in an excessive delay of the shutter release.

SUMMARY OF THE INVENTION

The primary object of the present invention is to provide a camera equipped with a remote controller in which it is possible to quickly effect a framing operation so as to achieve an immediate release of the shutter in response to the reception of a releasing signal without disregarding a photographer's intention with respect to framing.

To achieve the object mentioned above, according to the present invention, there is provided a camera having a remote controller provided separate from a body of the camera, wherein, based upon a signal outputted from the remote controller, a zoom lens of the camera is driven in accordance with calculated distance measuring data and a shutter of the camera is released. The camera includes a focal length detecting mechanism for detecting an existing focal length of the zoom lens, a mechanism for setting a framing mode in which a photographer carrying a remote controller is framed in a predetermined manner when the signal is output from the remote controller, a control mechanism for comparing a first focal length detected by the focal length detecting mechanism with a second focal length determined in the framing mode set by the setting mechanism, and for releasing the shutter under the condition that the first focal length is equal to or shorter than the second focal length.

According to another aspect of the present invention there is provided a camera having a remote controller provided separate from a body of the camera and a zoom lens provided on the camera body. The camera includes a plurality of framing modes, wherein in each of the framing modes a photographer carrying a remote controller is framed in a predetermined manner when the signal is output from the remote controller, a calculating mechanism for producing a plurality of focal length calculations of the zoom lens, the focal length calculations being used for a plurality of respective framing operations of the framing modes, a selecting mechanism for selecting one of the plurality of focal length calculations calculated by the calculating mechanism, a mechanism for driving the zoom lens to change an existing focal length of the zoom lens in accordance with the existing focal length in combination with one of the plurality of focal lengths selected by the selecting mechanism, and a release mechanism for releasing a shutter of the camera while prohibiting the driving mechanism to change the existing focal length under the condition that the existing focal length is shorter than the focal length selected by the selecting mechanism.

The present disclosure relates to subject matter contained in Japanese utility model application No. 5-22819 (filed on Apr. 6, 1993) which is expressly incorporated herein by reference in its entirety.

BRIEF DESCRIPTION OF THE DRAWINGS

The invention will be explained below in detail with reference to the accompanying drawings, in which.

DETAILED DESCRIPTION OF THE PREFERRED EMBODIMENTS

Figure 1:
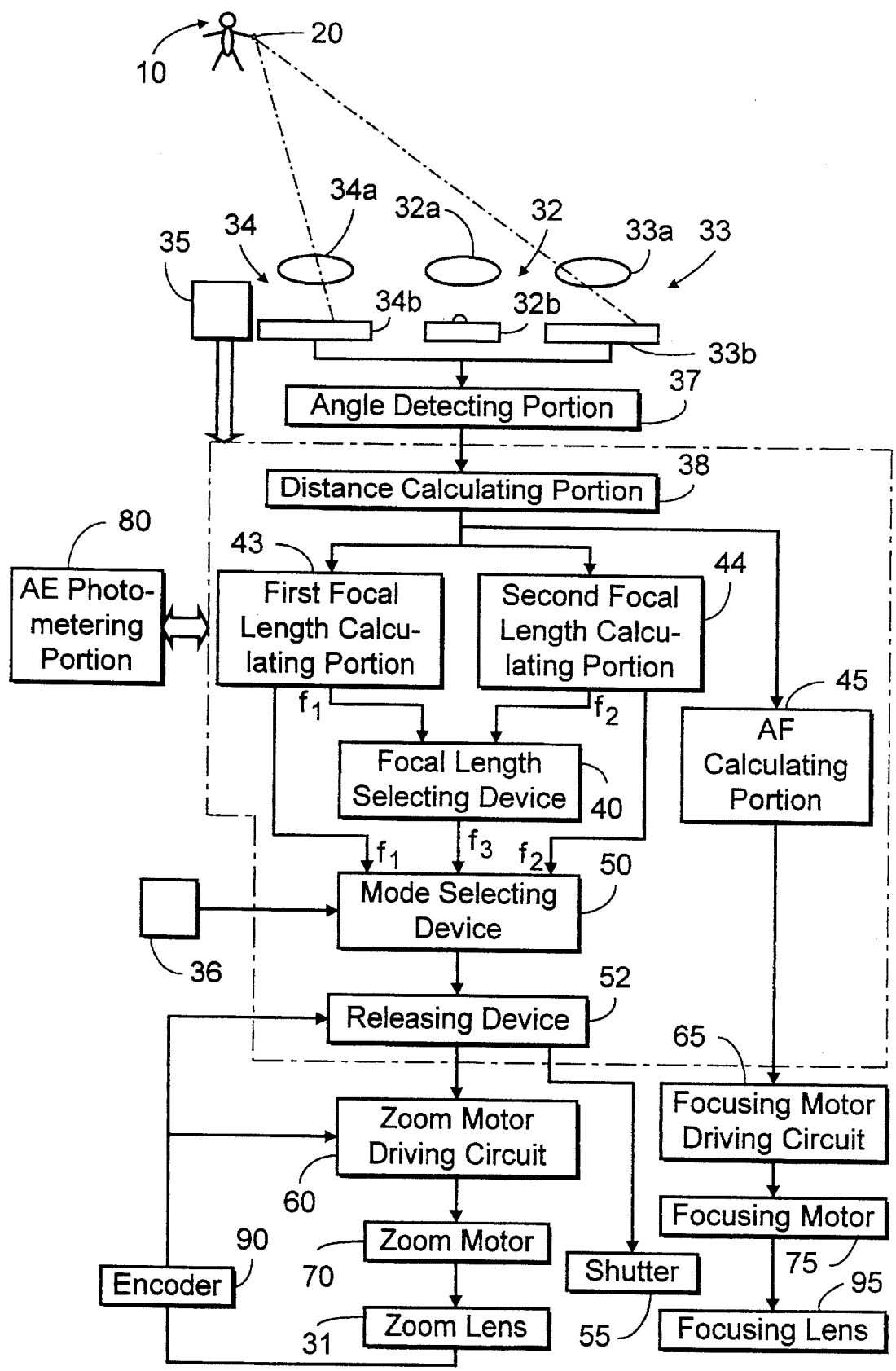
FIG. 1 is a block diagram of a camera having a remote controller according to a embodiment of the present invention.

FIG. 1 shows constituent components of a camera having a remote controller, according to the first embodiment of the present invention. A camera body 30 has a zoom lens (i.e., taking lens) 31 having a focusing lens 95, a distance measuring light emitter 32 which emits distance measuring light in a normal measuring mode of the camera (i.e., normal measuring light) in a direction substantially parallel with the optical axis O of the zoom lens 31, a first measuring light receiver 33, a second measuring light receiver 34, and a releasing light receiver 35.

The first measuring light receiver 33 receives the normal measuring light which is reflected on and returned from an object to be photographed when an object distance is measured in the normal measuring mode. The light receiver 33 also receives remote measuring light (e.g., infrared rays) emitted from a remote controller 20 when an object distance is measured in a remote measuring mode of the camera. The second measuring light receiver 34 receives the remote measuring light emitted from the remote controller 20 only in the remote measuring mode. The releasing light receiver 35 receives remote releasing light (e.g.., infrared rays) emitted from the remote controller 20 to release an electromagnetic shutter 55.

Figure 2:
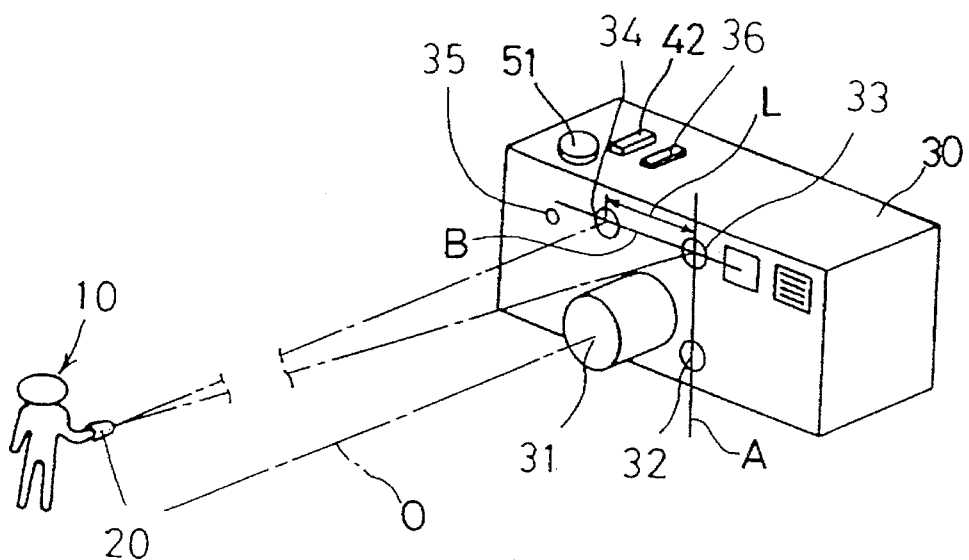
FIG. 2 is a schematic view of a camera shown in FIG. 1, when it is used.

The camera body 30 also has a mode selection switch 36, a measuring mode changing switch 42, and a shutter button 51, as shown in FIG. 2.

The measuring mode changing switch 42 switches the measuring mode between the normal measuring mode in which the normal measuring light is emitted from the measuring light emitter 32 toward the object to be taken to detect the object distance, and the remote measuring mode in which the remote measuring light is emitted from the remote controller 20 toward the camera body to detect the object distance.

The mode selection switch 36 is manually actuated by a photographer to select one of three kinds of framing modes, as well as manual and automatic taking modes in which the focal length of the zoom lens 31 is manually and automatically determined.

Figure 10:
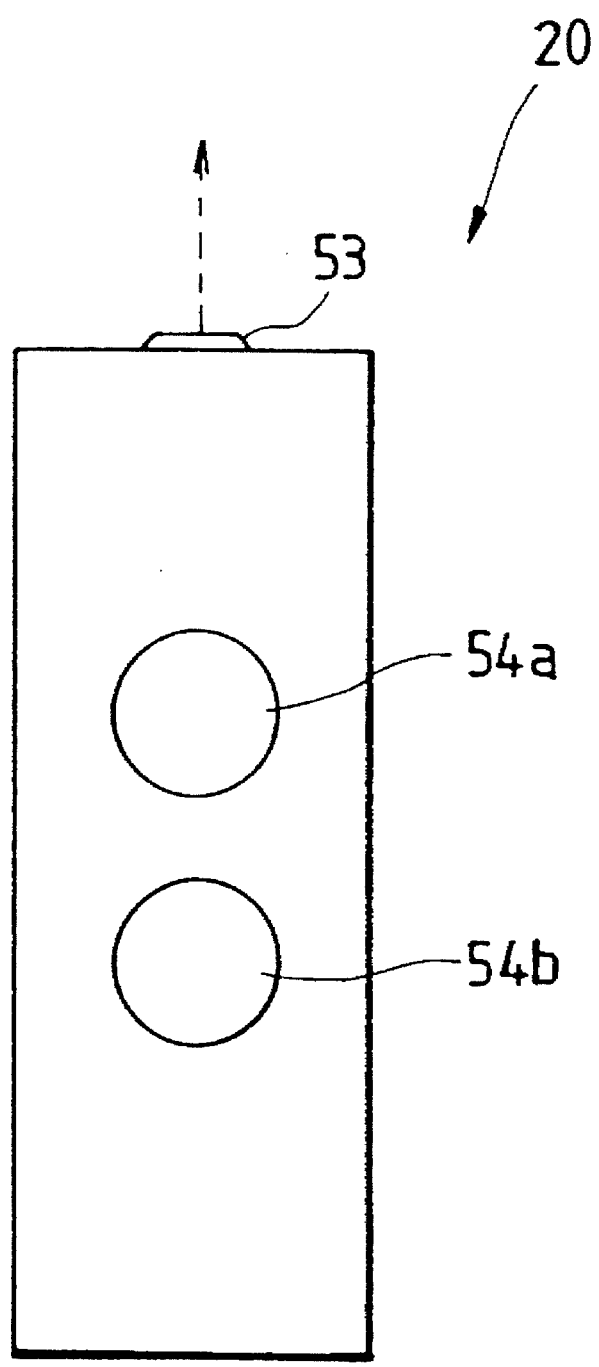
FIG. 10 is a schematic view of a remote controller according to an aspect of the present invention.

The remote controller 20, which is carried by the photographer when he or she wishes to be within the picture, has a light emitter 53 that emits the remote releasing light for actuating the shutter release of the camera body 30 by a remote control and the remote measuring light (e.g., infrared light having a wavelength different than that of the remote releasing light), as shown in FIG. 10. The remote controller 20 also has operation buttons 54a and 54b which are actuated to emit the remote releasing light and the remote measuring light, respectively.

As can be seen in FIG. 1, the measuring light emitter 32 includes a light emitting lens 32a and a light emitting element 32b which emits the normal measuring light. The first measuring light receiver 33 and the second measuring light receiver 34 have light receiving lenses 33a and 34a, and light receiving elements 33b and 34b which are made of, for example, a plurality of optical position detecting elements (not shown), such as PSD's (Position Sensitive Devices), which receive the remote measuring light emitted from the remote controller 20, respectively.

As can be seen in FIG. 2, the measuring light emitter 32, the first measuring light receiver 33, and the second measuring light receiver 34 are arranged in a manner such that a line "A" connecting the measuring light emitter 32 and the first measuring light receiver 33 is perpendicular to a line "B" connecting the first measuring light receiver 33 and the second measuring light receiver 34.

The light receiving elements 33b and 34b are made of optical position detecting elements, such as PSD's, and have elongated shapes. The light receiving elements 33b and 34b are arranged horizontally with respect to the camera body when the camera body is held in a normal horizontal manner. The light receiving element 34b is positioned such that its lengthwise direction is coincident with the line "B". The light receiving element 33b is positioned such that its lengthwise direction is inclined at an angle of 45° with respect to both line "B" and line "A", as viewed from the front of the camera body.

In the case that the measuring light emitter 32 and the elements 33b and 34b are provided on the same line, the element 33b is provided such that its lengthwise direction is coincident with the line connecting the measuring light emitter 32 and the element 34b.

Figure 3:
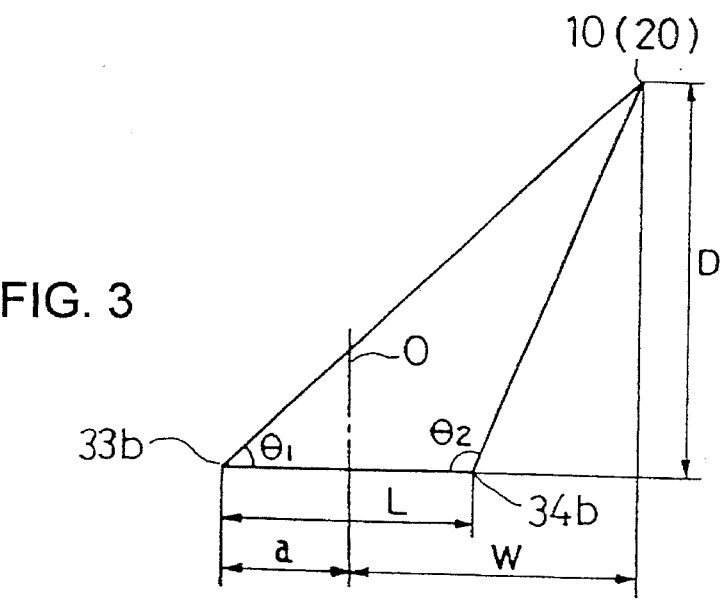
FIG. 3 is a diagram which shows data used in calculating object distance data in accordance with remote distance measuring light emitted from a remote controller of a camera shown in FIG. 1.

The camera body 30 is provided therein with an angle detecting portion (direction detecting means) 37 and an object distance calculating portion (object distance calculating means) 38 connected to the angle detecting portion 37. The light receiving elements 33b and 34b are connected to the angle detecting portion 37. The angle detecting portion 37 detects the direction of the remote measuring light which is represented by deflection angles $\theta_1$, $\theta_2$ (FIG. 3) of the front wall of the camera body 30 with respect to the optical axis O, in accordance with the position of one of the optical position detecting elements which detects the remote measuring light emitted from the remote controller 20. The detection data of the angle detecting portion 37 is output to the object distance calculating portion 38.

To solve the possible problem caused by that fact that the light receiving range of the light receiving elements 33b and 34b made of PSD's is narrower than the light receiving range of the releasing light receiver 35, which receives remote release light from the remote controller 20, the 1-second timer starts upon commencement of object distance measurement. Upon completion of the counting operation of the timer, the warning means 59 generates a warning signal to warn a photographer that a problem has occurred.

The above-noted problem is that, even if the object distance cannot be measured on the camera body side when the remote controller 20 (i.e., the object 10) is positioned out of the light receivable ranges of the light receiving elements 33b and 34b, the releasing operation would be effected if he or she emits the remote releasing light at that position.

The object distance calculating portion 38 calculates the object distance (i.e., the distance between the photographer 10 and the camera body 30), in accordance with the angles $\theta_1$, and $\theta_2$, which are detected by the angle detecting portion 37 as follows.

Namely, the object distance D between the remote controller 20 and the light receiving lenses 33b and 34b in the direction of the optical axis $0$ of the zoom lens 31 is calculated as follows.

$$D=(L \tan\theta_1 \cdot \tan\theta_2)/(\tan\theta_1 + \tan\theta_2)$$

wherein "L" designates the distance (i. e., base length) between the optical axis of the light receiving lens 33a of the first- measuring light receiver 33 and the optical axis; of the light receiving lens 34a of the second measuring light receiver 34.

Similarly, the distance W between the optical axis $0$ of the zoom lens 31 and an intersecting point of a normal (line) extending from the object 10 to a line perpendicular to the optical axis $0$ and the latter is given by;

$$\begin{aligned} W &= (D/\tan\theta_1) - a \\ &= L\tan\theta_2/(\tan\theta_1 + \tan\theta_2) - a \end{aligned}$$

wherein "a" designates the perpendicular distance between the optical axis O and the light receiving lens 33a of the first measuring light receiver 33.

The object distance calculating portion 38 outputs the distance data thus obtained to the first and second focal length calculating portions 43 and 44 and an AF calculating portion 45.

Figure 4:
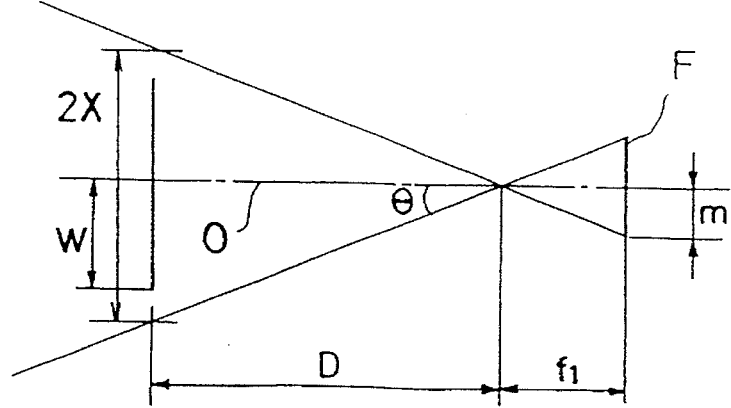
FIG. 4 is a diagram showing how to calculate a focal length by a first focal length calculating means, in the camera shown in FIG. 1.

The first focal length calculating portion 43 calculates an appropriate focal length $f_1$, at which the object 10 is located within the angle $\theta$ of view of the zoom lens 31, in accordance with the distance data from the distance calculating portion 38 (FIG. 4).

The angle $\theta$ of view of the zoom lens 31 is represented by;

$$\tan\theta = m/f_1.$$

wherein "$f_1$" designates the focal length of the zoom lens 31, and "m" the half-width of the picture plane of the film F, respectively.

Consequently, the following equation is obtained;

$$\tan\theta = W/Dr_1$$

$$\therefore f_1 = mr_1 D/W$$

wherein "$r_1$" designates the value obtained when the distance W is divided by half the total possible photographable length of an object 2X, (i.e., X) of the zoom lens 31 in the horizontal direction in the case where the camera of the present invention is located in a horizontal position. The value "$r_1$" is a predetermined value and is 0.9 ($r_1=0.9$) in the illustrated embodiment.

By way of example, "m" is 18 (m=18), so that $f_1=16.2D/W$.

Figure 5:
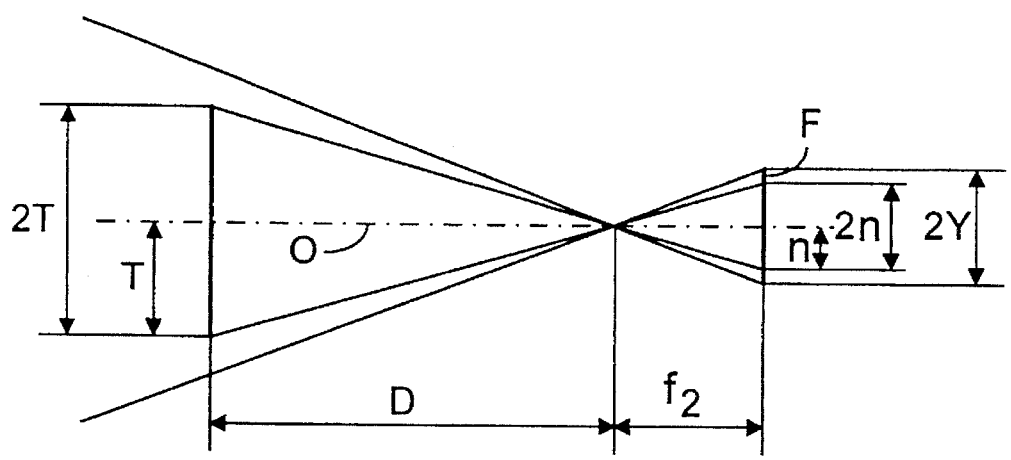
FIG. 5 is a diagram showing how to calculate a focal length by a second focal length calculating means, in the camera shown in FIG. 1.

The second focal length calculating portion 44 calculates an appropriate focal length $f_2$ of the zoom lens 31 at which an image of the object 10 has a predetermined size with respect to the film F, as shown in FIG. 5. In this case, if the height 2T of the object is fixed, for example at 1700 mm, the focal length $f_2$, of the zoom lens 31, at which an image of the object 10 to be formed on the film F has a constant height 2n, is given by the following formula, using the object distance D, the half-height T of the object 10, and the half-height of the image of the object 10 formed on the film F;

$$f_2 = nr_2 D/T \qquad (1)$$

wherein "$r_2$" designates the ratio obtained when the height 2n is divided by the vertical length of film frame 2Y when the camera is in the horizontal state. The value $r_2$ is a predetermined value and is, for example, 0.9 ($r_2=0.9$).

For example, when 35 mm film is used, Y=12. Accordingly, from formula (1), we have;

$$f_2 = 0.013D$$

(Note: 2T=1700)

Thus, the second focal length calculating portion 44 calculates the focal length $f_2$ of the zoom lens 31 at which the object image has a predetermined size with respect to the film F, in accordance with the object distance D from the object distance calculating portion 38, based on the formula $f_2=0.013D$.

Figure 6:
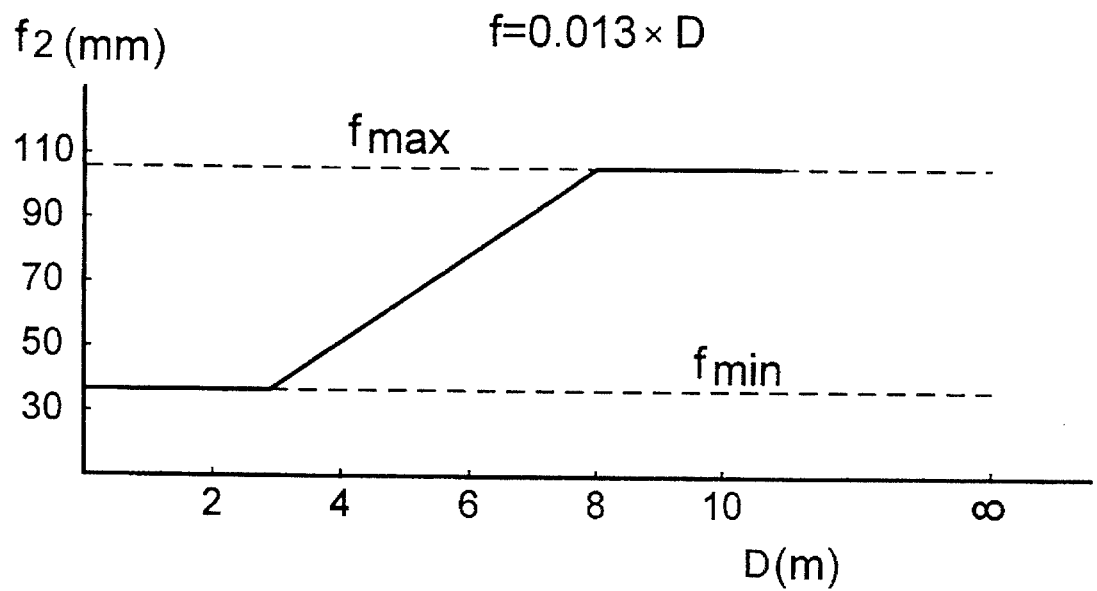
FIG. 6 is a diagram of a relationship between the focal lengths detected by the second focal length detecting means and the object distance.

FIG. 6 shows a relationship between the focal length $f_2$ of the zoom lens and the object distance D.

The AF calculating portion 45 calculates the displacement of the focusing lens 95 in accordance with the distance data D from the object distance calculating portion 38 and outputs the displacement to a focusing motor driving circuit 65.

The focal lengths $f_1$ and $f_2$ calculated in the first and second focal length calculating portions 43 and 44 are output to a focal length selecting device 40 which constitutes a focal length selecting means and a mode selecting means 50 which constitutes a focal length mode selecting means and a taking mode selecting means. "C" shown in FIG. 1 is a central processing unit (CPU).

The focal length selecting device 40 selects one of the focal lengths $f_1$ or $f_2$ having the shorter focal length as $f_2$. If the selected focal length $f_1$ or $f_2$ is not within the variable focal length range of the zoom lens 31, a focal length is set to be within the variable focal length range and is output to the mode selecting means 50.

The central processing unit "C" includes a releasing device 52. The releasing device 52 compares the existing focal length $f_b$ of the zoom lens 31 detected by the encoder 90 with the focal length $f_a$ selected among the focal lengths $f_1$, $f_2$, and $f_3$ in the mode selecting device 50. As a result, when the existing focal length $f_b$ of the zoom lens 31 is shorter than or equal to the selected focal length $f_a$ (i.e., closer to the wide-extremity of the zoom lens 31 than or equal to the selected focal length $f_a$), the releasing device 52 carries out a shutter releasing operation in which sectors of the electromagnetic shutter 55 are opened with a predetermined aperture size during a predetermined period of time, in accordance with the light measuring data obtained by the AE photometering portion 80.

The releasing device 52 does not carry out a shutter releasing operation as long as the existing focal length $f_b$ is longer than the focal length $f_a$ (i.e., closer to the tele-extremity than the focal length $f_a$). While the focal length $f_b$ is longer than the focal length $f_a$, the releasing device 52 outputs a signal to the zoom motor driving circuit 60 to actuate the zoom motor 70, thereby driving the zoom lens 31. When the existing focal length $f_b$ becomes shorter than or equal to the focal length $f_a$ (i.e., closer to the wide-extremity of the zoom lens than $f_a$ or equal to the focal length fa), the releasing device 52 stops the zoom lens 31 through the zoom motor driving circuit 60 and carries out the shutter releasing operation. The focusing lens 95 has been driven in advance of the drive of the zoom lens 31 in accordance with the calculated data (i.e., moving amount) of the AF calculating portion 45 so as to focus on the object 10 (photographer).

Figure 7:
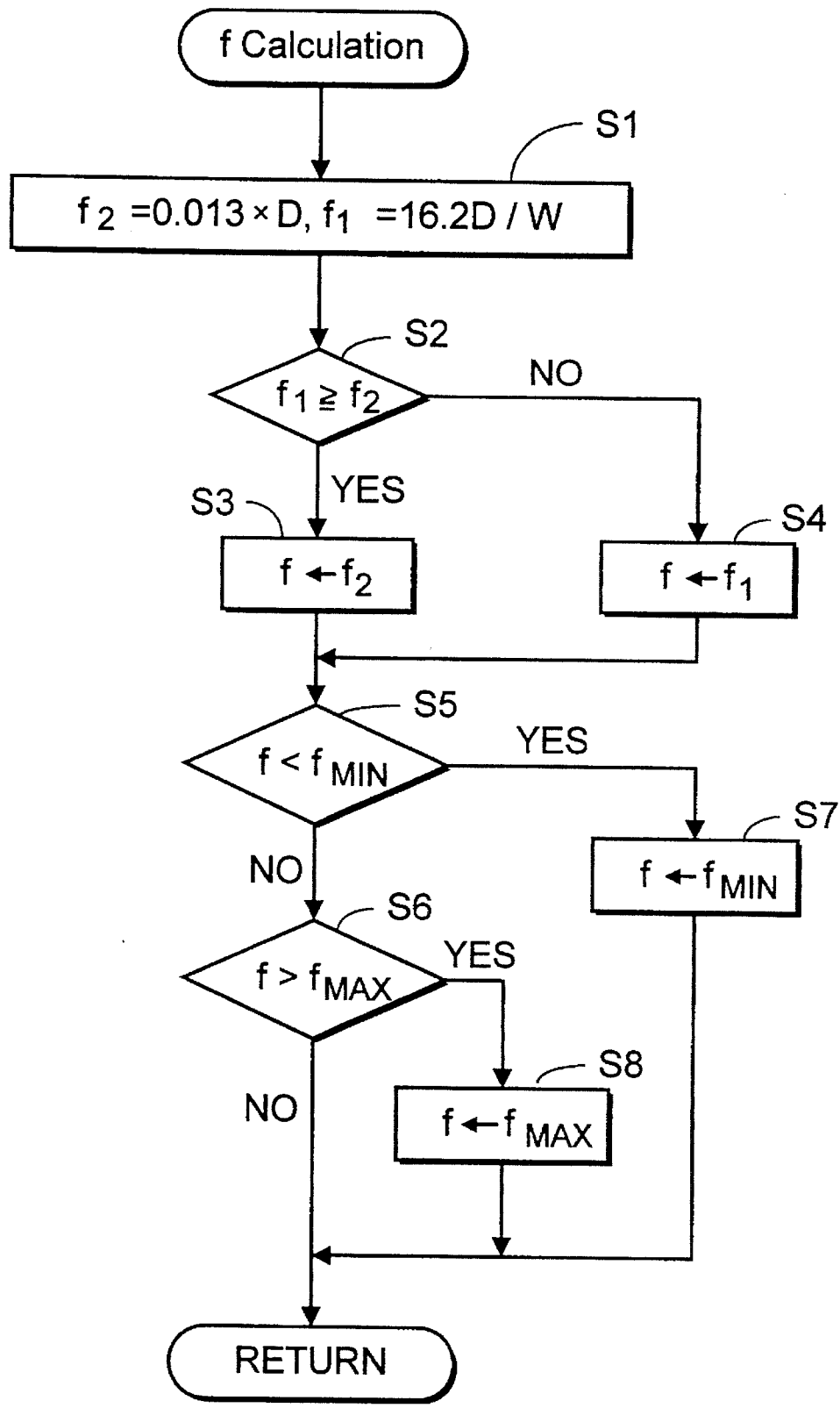
FIG. 7 is a flow chart of a selection operation of the focal lengths of a focal length selecting means in the camera shown in FIG. 1.

The following discussion will be directed to the setting operation of the focal length of the zoom lens 31 by the focal length selecting device 40 and the operations related thereto, with reference to FIG. 7.

In the first and second focal length calculating portions 43 and 44, the two focal lengths $f_1$ and $f_2$ of the zoom lens 31 are calculated in accordance with the distance data of the object distance calculating portion 38 (step S1).

Thereafter, whether the focal length $f_1$ is larger than the focal length $f_2$ is checked at step S2. If the focal length $f_1$ is equal to or larger than the focal length $f_2$, control proceeds to step S3 at which point the focal length $f_2$ is selected as a focal length f which gives the wide angle of view of the zoom lens 31. Conversely, if the focal length $f_1$ is smaller than the focal length $f_2$, control the proceeds to step S4 at which the focal length $f_1$ is selected as a focal length f which gives the wide angle of view of the zoom lens 31.

Thereafter, control proceeds to step S5 where the focal length selecting device 40 checks whether or not the selected focal length f is shorter than the shortest focal length $f_{MIN}$ of the zoom lens 31. If the focal length f is longer than the shortest focal length $f_{MIN}$, whether or not the focal length f is longer than the longest focal length $f_{MAX}$ is checked at step S6. If the focal length f is shorter than the shortest focal length $f_{MIN}$, the shortest focal length $f_{MIN}$ is selected as the focal length f, and the control is returned (step S7). If the focal length f is longer than the longest focal length $f_{MAX}$ at step S6, the longest focal length $f_{MAX}$ is selected as the focal length f, and the control is returned (step S8). If the focal length f is shorter than the longest focal length $f_{MAX}$, the control is directly returned. The focal length is thus calculated in the focal length selecting means 40.

The focal lengths $f_1$ and $f_2$ obtained by the first and second focal length calculating portions 43 and 44, and the focal length selected by the focal length selecting means 40 are input to the mode selecting device 50 which is connected to the mode selecting switch 36.

When the photographing mode selecting switch 36 is actuated, the mode selecting device 50 selects the first framing mode in which the focal length of the zoom lens 31 is identical to the focal length $f_1$ calculated by the first focal length calculating portion 43, the second framing mode in which the focal length of the zoom lens 31 is identical to the focal length $f_2$ calculated by the second focal length calculating portion 44, and the third framing mode in which the focal length of the zoom lens 31 is identical to the focal length selected by the focal length selecting device 40.

The mode selecting device 50 also selects the manual mode in which the zoom lens 31 can be manually moved in the direction of the optical axis 0 when the photographer actuates the mode changing switch 36, in addition to the selection of the framing modes. When the mode selecting device 50 selects one of the focal length modes mentioned above, the data representing the focal length of the zoom lens 31 corresponding to the selected focal length mode is output to the zoom motor driving circuit 60, which constitutes a zoom lens driving means. Conversely, when the mode selecting device 50 selects the manual mode in which the zoom lens 31 is manually moved in the optical axis direction, data representing the focal length is not output from the mode selecting device 50 to the motor driving circuit 60.

Namely, the mode selecting device 50 serves as a photographic mode selecting means for selecting the automatic mode in which the zoom lens 31 is moved in the optical axis direction by the motor driving circuit 60 or the mode in which the zoom lens 31 is manually moved in the optical axis direction, and further serves as a focal length selecting means for selecting one of the above-mentioned three focal length modes three framing modes.

The motor driving circuit 60 drives the zoom motor 70 which constitutes a zoom lens driving means together with the motor driving circuit 60 to move the zoom lens 31 in the optical axis direction, in accordance with the focal length data of the zoom lens 31 corresponding to the set framing mode.

The focusing motor driving circuit 65 drives the focusing motor 75 in accordance with the amount of defocus calculated by the AF calculating portion 45 to move the focusing lens 95 in the optical axis direction thereof. Numeral 80 designates the AE photometering portion of the automatic exposure mechanism (not shown), and 90 the encoder for detecting the driving state of the zoom lens 31. The AE photometering portion 80 is connected to the central processing unit C having the object distance calculating portion 38, the first focal length calculating portion 43, the second focal length calculating portion 44, the focal length selecting device 40, and the mode selecting device 50. The encoder 90 is connected to the motor driving circuit 60 to feed-back the latest focal length data of the zoom lens 31.

Figure 8:
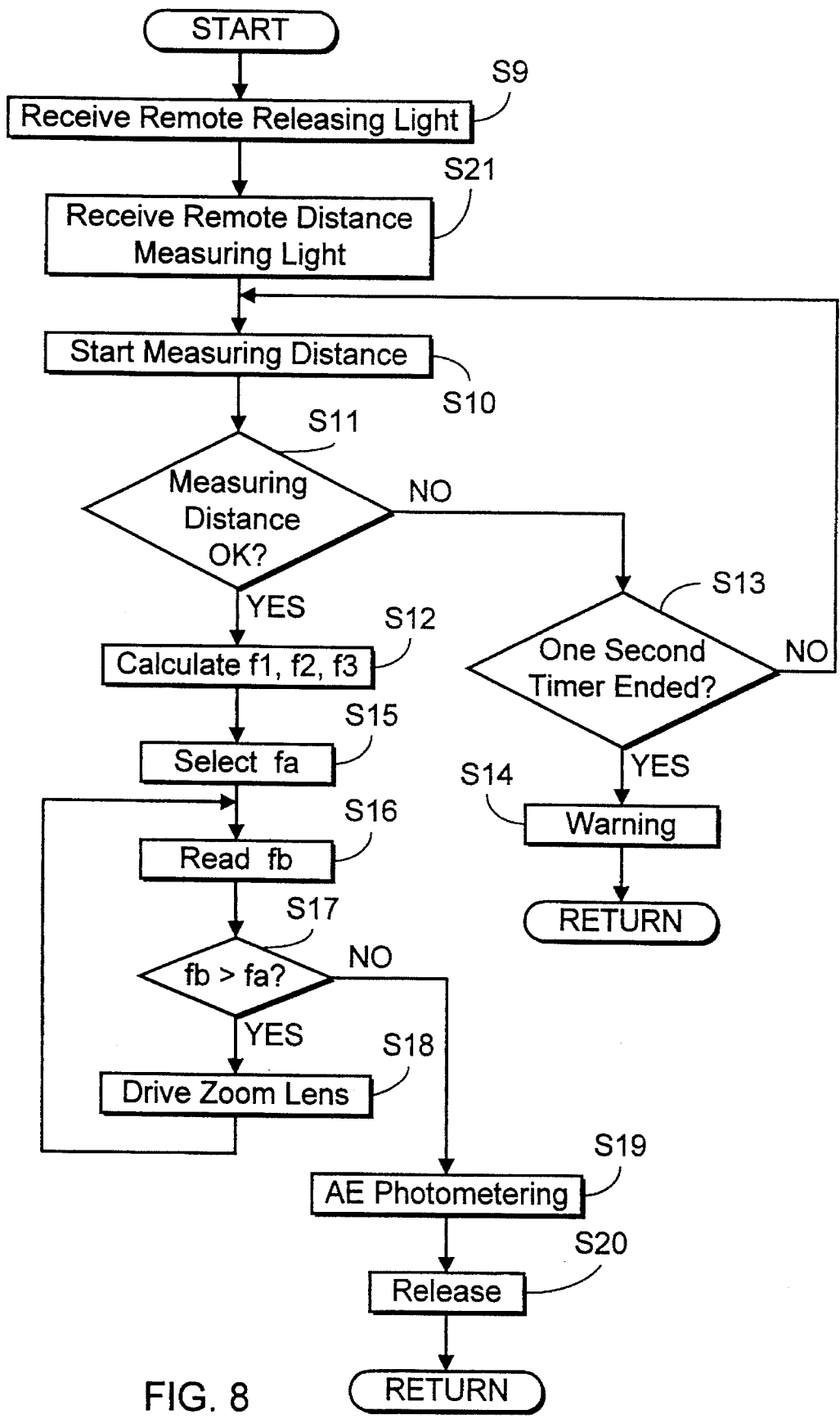
FIG. 8 is a flow chart of operations from the receipt of remote releasing light to a shutter release in the camera body.

The automatic drive of the zoom lens 31 of the camera as constructed above is effected in accordance with the distance data (FIG. 8), as follows.

Before a picture is taken, the measuring mode changing switch 42 is actuated to select the remote measuring mode. The object 10 to be taken, i.e., the photographer carries the remote controller 20 and moves to a desired position within the picture.

In this position, the photographer points the remote controller 20 toward the camera and presses the operation button 54a. As a result, the releasing light is emitted from the remote controller 20 and is then received by the releasing light receiver 35 of the camera body (step S9). Thereafter, the remote measuring light which is emitted from the remote controller 20 by actuating the operation switch 54b is received by the first and second measuring light receivers 33 and 34.

Consequently, the angle detecting portion 37 and the distance calculating portion 38 calculate the distance data in accordance with the position of the receipt of the remote measuring light by the light receiving elements 33b and 34b of the first and second measuring light receivers 33 and 34 (step S10). The distance data thus obtained is output to the first and second focal length calculating portions 43 and 44.

At step S11, whether the calculation of the object distance is appropriately effected by the distance calculating portion 38 is checked. If the calculation of the object distance is appropriately effected, control proceeds to step S12. Conversely, if calculation of the object distance is not appropriately effected (i.e., if distance data is not available), the warning signal is issued by the warning means 59 when the time set by the 1-second timer, which started upon commencement of the measurement of the object distance, has elapsed (steps S13 and S14).

At step S12, the focal length $f_1$ is calculated in the first focal length calculating portion 43, the focal length $f_2$ in the second focal length calculating portion 44, and the focal length $f_3$ in the focal length selecting device 40, respectively, in accordance with the object distance data output from the distance calculating portion 38.

Thereafter, the focal lengths $f_1$, $f_2$, and $f_3$ are calculated and the corresponding focal length data are sent to the mode selecting device 50 (step 12). Further, in the mode selecting device 50, the focal length which corresponds to the mode selected among the focal lengths $f_1$, $f_2$, and $f_3$, in accordance with the operation of the mode changing switch 36, is selected as the focal length $f_a$ (step 15). The releasing device 52 obtains and monitors the existing focal length $f_b$ of the zoom lens 31 through the encoder 90 and compares the obtained existing focal length $f_b$ with the focal length $f_a$ selected by the mode selecting device 50 (steps 16 and 17). As a result of this comparison, when the existing focal length $f_b$ of the zoom lens 31 is shorter than or equal to the selected focal length fa, the releasing device carries out the shutter releasing operation, in which the sectors of the electromagnetic shutter are opened with a predetermined aperture size during a predetermined period of time in accordance with the light measuring data obtained by the AE photometering portion 80 (steps 19 and 20).

On the other hand, at step 17, when the existing focal length $f_b$ is longer than the selected focal length $f_a$, the releasing device 52 does not carry out the shutter releasing operation, but drives the zoom motor 70 through the motor driving circuit 60 thereby driving the zoom lens 31 towards the wide-extremity. This operation is carried out since the object 10 would not be completely within a set photographable range when the existing focal length $f_b$ is longer than the selected focal length $f_a$ (step 18). Thereafter, the releasing device 52 stops the zoom lens 31 when the existing focal length $f_b$ becomes shorter than or equal to the selected focal length $f_a$. In other words, the releasing device 52 brings the zoom lens 31 to a stop through the zoom motor driving circuit 60 when the focal length $f_b$ is equal or shorter than the focal length $f_a$ and also makes the sectors of the shutter 55 open with a predetermined aperture size during a predetermined period of time to release the shutter 55 in accordance with the light measuring data obtained by the AE photometering portion 80. The focusing lens 95 has been driven in advance of the drive of the zoom lens 31 in accordance with the calculated data (i.e., moving amount) of the AF calculating portion 45 so as to focus on the object 10 (i.e., photographer) (steps 19 and 20).

As mentioned above, in the illustrated embodiment, the focusing operation of the focusing lens 95 is performed by the focusing motor 75 before the zoom motor 70 drives the zoom lens 31 in the optical axis direction O. During the focusing operation, the operation of the focusing motor 75 is effected by the focusing motor driving circuit 65 as a result of the displacement calculated by the AE calculating portion 45 so that the focusing lens 95 which is initially located at the infinite position is moved in the optical axis direction thereof. Accordingly, even if the object 10 to be taken is not located at the center of the field of view of the zoom lens 31, the distance of the object can be detected regardless of the position thereof within the field of view of the zoom lens 31.

On the other hand, when the object distance is measured by the normal measuring light emitted from the measuring light emitter 32 of the camera body 30, the normal measuring mode needs to be selected in advance by operating the mode selection switch 36. In the normal measuring mode, the remote controller 20, held by the photographer 10, is actuated to emit remote releasing light. In response thereto, the measuring light emitter 32 of the camera body 30 emits the normal measuring light toward the object 10.

Figure 9:
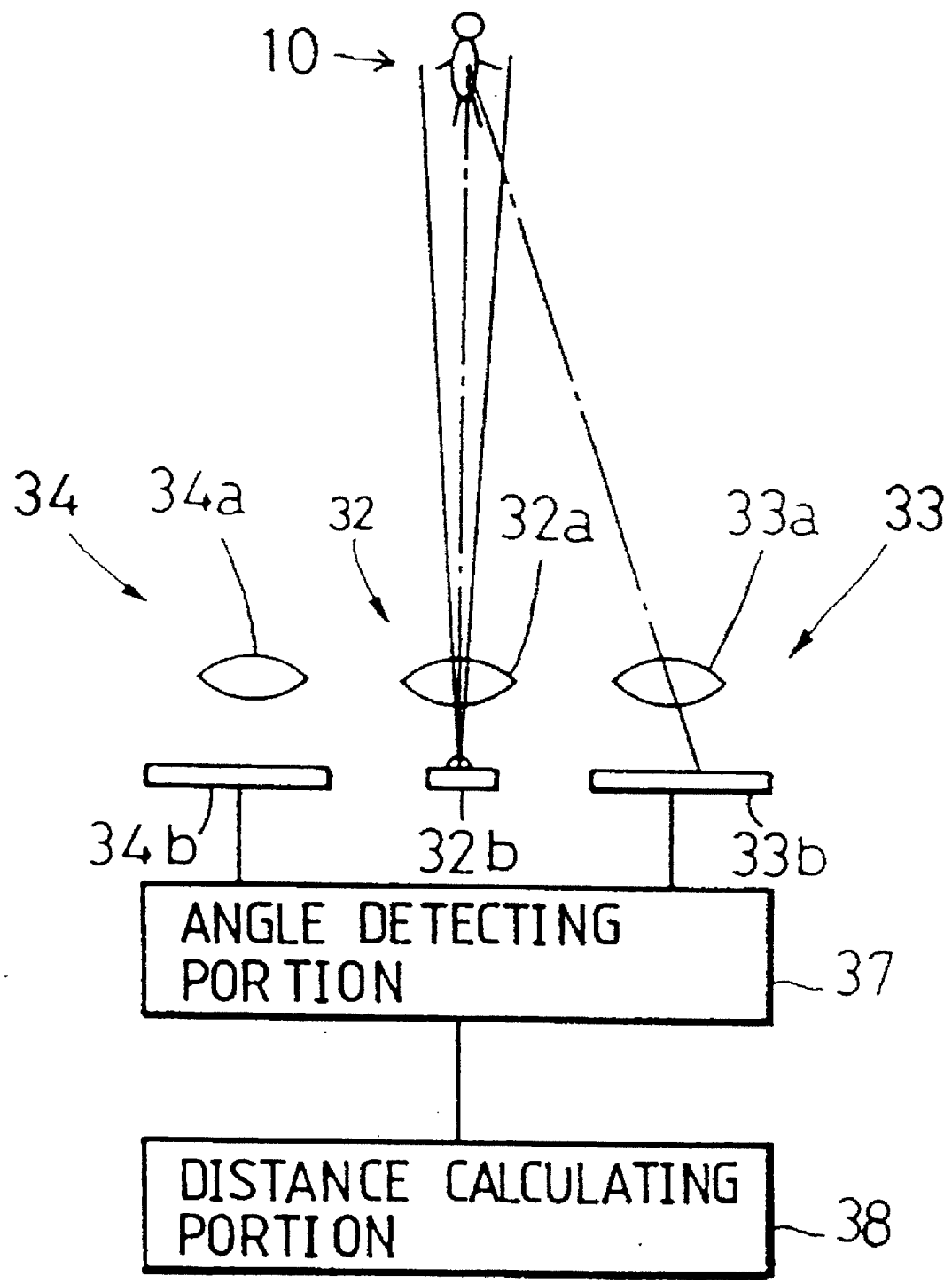
FIG. 9 is a schematic view of internal constituent elements of a camera which receives remote distance measuring light in the camera shown in FIG. 1.

The normal measuring light emitted from the measuring light emitter 32 is made incident upon the object 10 and is reflected thereby to be received by the first measuring light receiver 33, as shown in FIG. 9. The angle detecting portion 37 detects the angle of deflection of the front wall of the camera body with respect to the optical axis 0, in accordance with the position of the receipt of the normal measuring light by the first measuring light receiver 33 and the distance (i.e, base length) L between the first measuring light receiver 33 and the measuring light emitter 32. Furthermore, the angle detecting portion 37 detects the distance data in accordance with the angle of deflection and outputs the data (i.e, numerical values) to the distance calculating portion 38. As a result, the distance calculating portion 38 calculates the distance of the object 10 from the camera body 30 in accordance with the data input thereto.

As can be seen from the above discussion, in a camera having an object distance measuring device according to the present invention, since the object distance is detected by light emitted from the side of the object 10, the focal length of the zoom lens 31 can be precisely adjusted in accordance with the detected object distance. Consequently, if the photographer is the object photographed, the object will be precisely in focus. Furthermore, a framing operation can be effected in which the object 10 is within the photographable range of the camera or in which the image of the object 10 has a predetermined size relative to the film. It is also possible to automatically effect framing in which the focal length of the zoom lens 31 is on the wide angle side.

Furthermore, it is possible to automatically select the framing modes mentioned above. In addition, the mode in which the focal length of the zoom lens 31 is automatically adjusted and the mode in which the photographer manually adjusts the focal length of the zoom lens 31 can be selected.

In the above embodiment, regardless of the framing mode selected, in the case that the existing focal length $f_b$ of the zoom lens 31 is shorter than (i.e., closer to the wide-extremity of the zoom lens 31 than) the focal length $f_a$ in the selected framing mode, the releasing device 52 carries out the releasing operation without driving the zoom lens 31 to vary the existing focal length $f_b$. With this arrangement, the photographer might be photographed with an image of himself smaller than he intended, but at least it is certain that he will be within the photographable range (i.e., image area of the film). Accordingly, the probability that the photographer will not be fully imaged within the picture is minimized, while the speed of photographing is maximized On the other hand, when the existing focal length $f_b$ is longer than the focal length $f_a$ of the selected framing mode, it is possible that a portion of the photographer which is to be photographed will be out of the image area if the releasing operation is executed without driving the zoom lens 31 to vary the existing focal length $f_b$. Therefore, the releasing device 52 drives the zoom lens 31 towards the wide-extremity and carries out the releasing operation wherein the focal length $f_b$ is shorter than or equal to the selected focal length $f_a$. Accordingly, in the present embodiment, it can be understood that a picture in which the photographer is properly photographed can be taken, while taking a photographer's intention with respect to framing into consideration.

The present invention is not be limited to the above-noted embodiment. For example, it is possible to move the zoom lens 31 in the optical axis direction in accordance with the focal length $f_1$ only calculated by the first focal length calculating portion 43. It is possible to move the zoom lens 31 in the optical axis direction in accordance with the focal length $f_2$ only, calculated by the second focal length calculating portion 44. It is possible to move the zoom lens 31 in the optical axis direction in accordance with the focal length only, selected by the focal length selecting means 40.

Although there are two measuring light receivers provided in the camera body 30 to receive the remote measuring light emitted from the remote controller 20 in the illustrated embodiment, it is possible to provide three or more measuring light receivers in the camera body.

Furthermore, although the remote measuring light is separate from the remote releasing light in the illustrated embodiment, it is possible to use the same light for both the remote releasing light and the remote measuring light.

As is explained above, according to the camera having a remote controller of the present invention, the zoom lens is not continuously driven until the focal length satisfies a focal length selected in the framing mode. Accordingly, it is possible to release the shutter without driving the zoom lens to vary the focal length of the zoom lens under the condition that the existing focal length of the zoom lens is shorter than the focal length selected in the framing mode. As a result, when photographing with a remote controller, it is possible to take a picture of the photographer swiftly without misframing, while taking his or her intention into consideration.

Although the invention has been described with reference to particular means, materials and embodiments, it is to be understood that the invention is not limited to the particulars disclosed and extends to all equivalents within the scope of the claims.

I claim:

1. A zoom lens camera having a focusing function that is operable in accordance with direction data of an object to be photographed, said camera comprising:

a remote controller that is separate from a camera body of said camera and which is capable of being actuated from an object side of said camera of emit a measuring light and a shutter release signal toward said camera;

means for calculating a distance from said camera to said remote controller based on upon said direction data in accordance with detection of said measuring light detected on said camera body;

means for selecting a framing mode from a plurality of framing modes;

means for setting a plurality of focal lengths in accordance with said calculated distance data, said plurality of focal lengths corresponding to said plurality of framing modes to enable an operator of the remote controller to be framed on an imaging area of said camera;

means for driving said zoom lens to a selected focal length in accordance with the selection of a framing mode;

means for detecting a present focal length of said zoom lens;

means for comparing said present focal length detected by the detecting means with said selected focal length selected by said framing mode selecting means;

a shutter; and means for releasing said shutter after said shutter release signal has been issued from said remote controller, said releasing means releasing said shutter without changing said focal length upon issuance of said release signal when said present focal length is equal to or shorter than said selected focal length, and said releasing means releasing said shutter after said driving means drives said zoom lens until a focal length of said zoom lens becomes shorter than said selected focal length when said present focal length is longer than said selected focal length.

2. The camera of claim 1, wherein said plurality of framing modes includes a first framing mode in which the image of the photographer is situated within a certain angle of view of the zoom lens, a second framing mode in which the image of the photographer is a certain size with respect to a film plane, and a third framing mode in which the shorter of said two focal lengths of the zoom lens is selected.

3. The camera of claim 1, further comprising a mode selecting manual switch provided on the camera body for instructing the mode selecting means to select one of the plurality of framing modes.

4. The camera of claim 3, wherein said mode selecting means is further capable of selecting an automatic mode in which the zoom lens is automatically driven or a manual mode in which the zoom lens is manually driven, and wherein said mode selecting manual switch is further capable of instructing the mode selecting device to designate the automatic mode or the manual mode.

5. A zoom lens camera system comprising a camera body and a remote controller separate from said camera body;

said remote controller comprising: means for emitting measuring light and means for emitting shutter release light toward said camera body;

said camera body comprising:

a zoom lens;

a shutter;

means for receiving said measuring light and for detecting the direction from which said measuring light was emitted, said direction data being used to calculate a distance between said remote controller and said camera body;

a framing mode selecting means for selecting a framing mode from a plurality of framing modes;

means for setting a plurality of focal lengths based upon said calculated distance data, said plurality of focal lengths corresponding to said plurality of framing modes to enable an operator of said remote controller to be framed on an imaging area of said camera;

a focal length detecting means for detecting a present focal length of said zoom lens;

a driving means for driving said zoom lens in an optical axis direction; and a releasing means for releasing said shutter after said shutter release light has been issued from said remote controller, said releasing a means releasing said shutter without changing said focal length upon issuance of said shutter release light when said present focal length is equal to or shorter than said selected focal length, and said releasing means releasing the shutter after driving said zoom lens until a focal length of said zoom lens becomes shorter than said selected focal length when said present focal length is longer than said selected focal length.

6. The camera of claims 5, wherein said plurality of framing modes includes a first framing mode in which the image of the photographer is situated within a certain angle of view of the zoom lens, a second framing mode in which the image of the photographer is a certain size with respect to a film plane, and a third framing mode in which the shorter of said two focal lengths of the zoom lens is selected.

7. The camera of claim 5, further comprising a mode selecting manual switch provided on the camera body for instructing the mode selecting means to select one of the plurality of framing modes.

8. The camera of claim 7, wherein said mode selecting means is further capable of selecting an automatic mode in which zoom lens is automatically driven or a manual mode in which the zoom lens is manually driven, and wherein said mode selecting manual switch is further capable of instructing the mode selecting device to designate the automatic code or the manual code.

* * * * *